(12) United States Patent
Allen et al.

(10) Patent No.: US 7,748,103 B2
(45) Date of Patent: Jul. 6, 2010

(54) METHOD OF MANUFACTURING A PERPENDICULAR MAGNETIC RECORDING WRITE HEAD WITH NOTCHED TRAILING SHIELD

(75) Inventors: Donald G. Allen, Morgan Hill, CA (US); Amanda Baer, Campbell, CA (US); Michael Feldbaum, San Jose, CA (US); Wen-Chien David Hsiao, San Jose, CA (US); Vladimir Nikitin, Campbell, CA (US); Aron Pentek, San Jose, CA (US); Katalin Pentek, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1108 days.

(21) Appl. No.: 11/379,969

(22) Filed: Apr. 24, 2006

(65) Prior Publication Data

US 2007/0263324 A1    Nov. 15, 2007

(51) Int. Cl.
*G11B 5/187* (2006.01)
*G11B 5/23* (2006.01)

(52) U.S. Cl. ............. 29/603.15; 29/603.13; 29/603.11; 29/603.18; 360/125.03; 360/119.02

(58) Field of Classification Search ............. 29/603.13, 29/603.15, 603.11, 603.16, 603.18; 360/125.03, 360/125.09, 119.02, 119.04, 123.12
See application file for complete search history.

(56) References Cited

U.S. PATENT DOCUMENTS

| | | | | |
|---|---|---|---|---|
| 5,567,333 A | | 10/1996 | Hira et al. | |
| 6,081,408 A | * | 6/2000 | Partee | 29/603.15 X |
| 2003/0231426 A1 | | 12/2003 | Sato | |
| 2004/0212923 A1 | | 10/2004 | Taguchi | |
| 2004/0218312 A1 | | 11/2004 | Matono | |
| 2005/0068665 A1 | | 3/2005 | Le et al. | |
| 2005/0243464 A1 | | 11/2005 | Lille | |
| 2005/0259355 A1 | | 11/2005 | Gao et al. | |
| 2005/0264931 A1 | | 12/2005 | McFadyen | |

FOREIGN PATENT DOCUMENTS

JP    2000339624 A  * 12/2000

OTHER PUBLICATIONS

A.I. Stognij et al., "Reactive Ion-Beam Etching of Thick Polyimide Layers in an Oxygen+Argon Mixture", Russian Microelectronics, vol. 30, No. 5, 2001, pp. 330-334.
EPO Search Report.

* cited by examiner

*Primary Examiner*—A. Dexter Tugbang
(74) *Attorney, Agent, or Firm*—Thomas R. Berthold

(57) ABSTRACT

A perpendicular magnetic recording write head has a write pole, a trapezoidal-shaped trailing shield notch, and a metal gap layer between the write pole and notch. The write pole has a trailing edge that has a width substantially defining the track width and that faces the front edge of the notch but is spaced from it by the gap layer. The write head is fabricated by reactive ion beam etching of a thin mask film above the write pole to remove the mask film and widen the opening at the edges of the write pole. The gap layer and notch are deposited into the widened opening above the write pole. The write pole has nonmagnetic filler material, such as alumina, surrounding it except at its trailing edge, where it is in contact with the gap layer, which is formed of a different material than the surrounding filler material.

7 Claims, 7 Drawing Sheets

METHOD OF MANUFACTURING A PERPENDICULAR MAGNETIC RECORDING WRITE HEAD WITH NOTCHED TRAILING SHIELD

BACKGROUND OF THE INVENTION

1. Field of the Invention

This invention relates generally to perpendicular magnetic recording write heads, and more particularly to a write head with a notched trailing shield for use in magnetic recording hard disk drives.

2. Description of the Related Art

Perpendicular magnetic recording, wherein the recorded bits are stored in a perpendicular or out-of-plane orientation in the recording layer, is a promising path toward ultra-high recording densities in magnetic recording hard disk drives. As shown in FIG. 1A, a "dual-layer" medium includes a perpendicular magnetic data recording layer (RL) on a "soft" or relatively low-coercivity magnetically permeable underlayer (SUL) formed on the disk substrate. This type of medium is shown with a single write pole (WP) type of recording head. A thin film coil (C) is shown in section between the WP and the return pole (RP) of the recording head. Write current through coil C induces a magnetic field (shown by dashed line 10) from the WP that passes through the RL (to magnetize the region of the RL beneath the WP), through the flux return path provided by the SUL, and back to the RP. The recording head is typically formed on an air-bearing slider that has its air-bearing surface (ABS) supported above the RL of the medium. In FIG. 1A, the medium moves past the recording head in the direction indicated by arrow 20. The RL is illustrated with perpendicularly recorded or magnetized regions, with adjacent regions having opposite magnetization directions, as represented by the arrows. The magnetic transitions between adjacent oppositely-directed magnetized regions are detectable by the read head (not shown) as the recorded bits.

FIG. 1A also shows a section of a trailing shield (TS) with a trailing shield notch (TSN) that is near the WP but spaced from the WP by a gap of nonmagnetic material. The use of a TS separated from the WP by a nonmagnetic gap slightly alters the angle of the write field and makes writing more efficient. The TSN causes a stronger magnetic field below the WP and sharper magnetic transitions written by the head, which is desirable. FIG. 1B is a view in the direction 1B-1B of FIG. 1A and illustrates the width of the WP to substantially define the trackwidth (TW) of the data recorded in the RL. The TS is substantially wider than the WP in the cross-track direction but the TSN portion is generally the same width as the WP. FIG. 2 is a perspective view showing the relationship between the WP, the TS with TSN, and the recording medium with the RL and SUL. As shown, the TSN is generally rectangularly shaped with a front edge 30 and generally parallel side edges 32, 34. FIG. 3 is a view of the slider ABS, as seen from the disk, and shows portions of the write head, with details of the WP, the TSN and the gap between the WP and the TSN. The WP has an end 40 generally parallel to the ABS and a trailing edge 42 that is generally orthogonal to the along-the-track direction and generally defines the TW. The gap typically includes alumina ($Al_2O_3$) as a result of the conventional fabrication process wherein the alumina is a "thin alumina mask" (TAM) formed over the layer of magnetic material used to form the WP. A resist is formed over the TAM and the structure is then ion milled to form the WP. After removal of the resist, the TAM remains above the WP. A thin film 50 of additional gap material, such as Ta or Rh, is deposited over the TAM, followed by electroplating of the magnetic material, typically NiFe, to form the generally rectangularly shaped TSN (with a front edge 30 and generally parallel side edges 32, 34) and the remainder of the TS.

The generally rectangularly shaped TSN can become saturated during writing. Additionally, the TAM that remains above the WP makes the gap layer thicker than necessary and thus makes the write field gradient less than optimal.

What is needed is a perpendicular magnetic recording write head with a trailing shield having an improved trailing shield notch and reduced-thickness gap between the write pole and the trailing shield notch.

SUMMARY OF THE INVENTION

The invention is a perpendicular magnetic recording write head with a write pole, a trapezoidal-shaped trailing shield notch, and a metal gap layer between the write pole and notch. The write pole has a trailing edge that has a width substantially defining the track width and that faces the front edge of the notch but is spaced from it by the gap layer. The front edge of the notch is generally the same width as the width of the trailing edge of the write pole. The gap layer and notch are deposited into a widened opening above the write pole, so the sides of the notch diverge from the write pole to cause the generally trapezoidal shape, with the notch back edge being substantially wider than the notch front edge, and thus wider than the track width. The write pole has nonmagnetic filler material, such as alumina, surrounding it except at its trailing edge, where it is in contact with the gap layer, which is formed of a different material than the surrounding filler material. The write head is fabricated by a process than includes reactive ion beam etching of a thin mask film above the write pole to remove the mask film and widen the opening at the edges of the write pole, without damaging the underlying write pole material. There is no mask film in the gap, which results in a reduced-thickness gap. The generally trapezoidal shape of the notch, which is wider than the write pole, reduces saturation of the notch during writing.

For a fuller understanding of the nature and advantages of the present invention, reference should be made to the following detailed description taken together with the accompanying figures.

DETAILED DESCRIPTION OF THE INVENTION

Figure 1A:
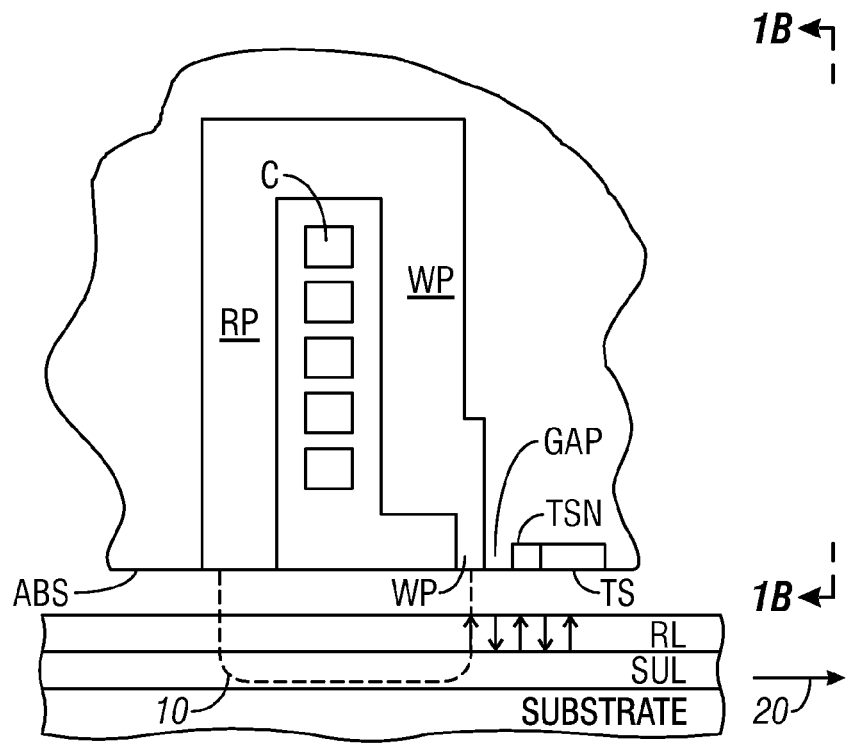
FIG. 1A is a schematic of a prior art perpendicular magnetic recording system.
Figure 1B:
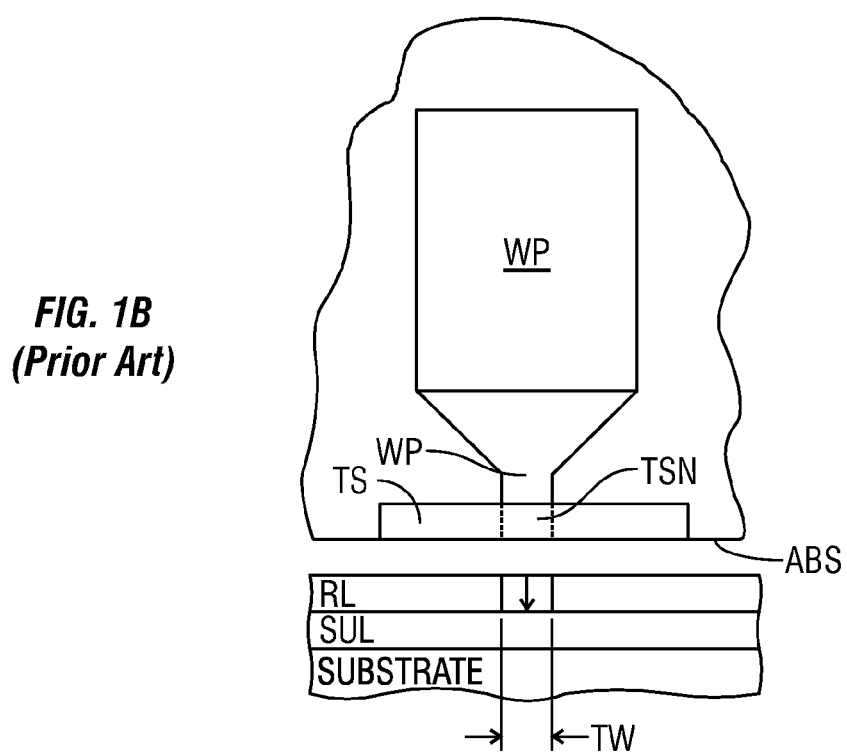
FIG. 1B is a view in the direction 1B-1B of FIG. 1A and illustrates the width of the WP to substantially define the trackwidth (TW) of the data recorded in the RL.
Figure 2:
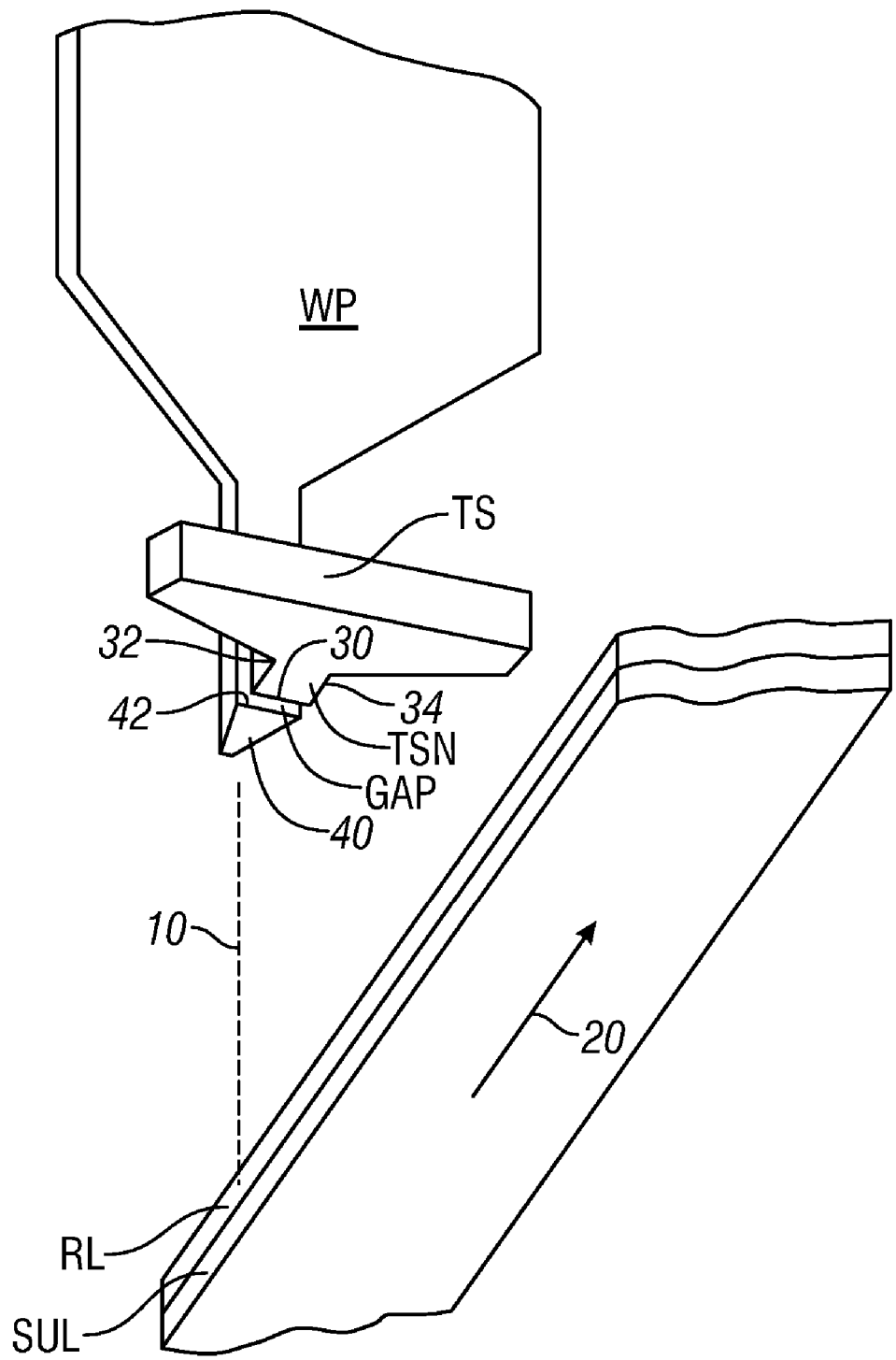
FIG. 2 is a perspective view showing the relationship between the WP, the TS with TSN, and the recording medium with the RL for the system of FIG. 1A.
Figure 3:
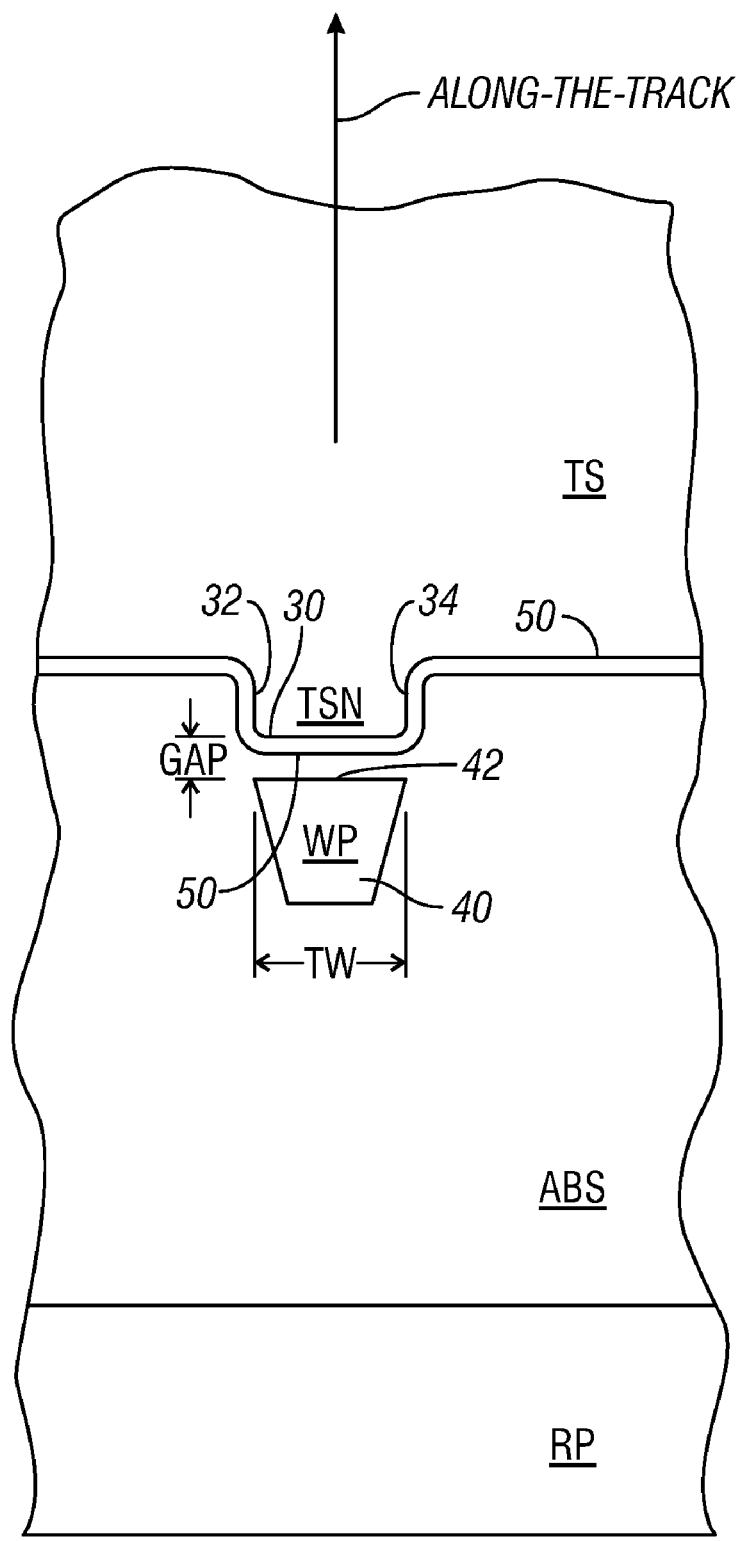
FIG. 3 is a view of the slider ABS for the system of FIG. 1A, as seen from the disk, and shows portions of the write head, with details of the WP, the TSN and the gap between the WP and the TSN.
Figure 4:
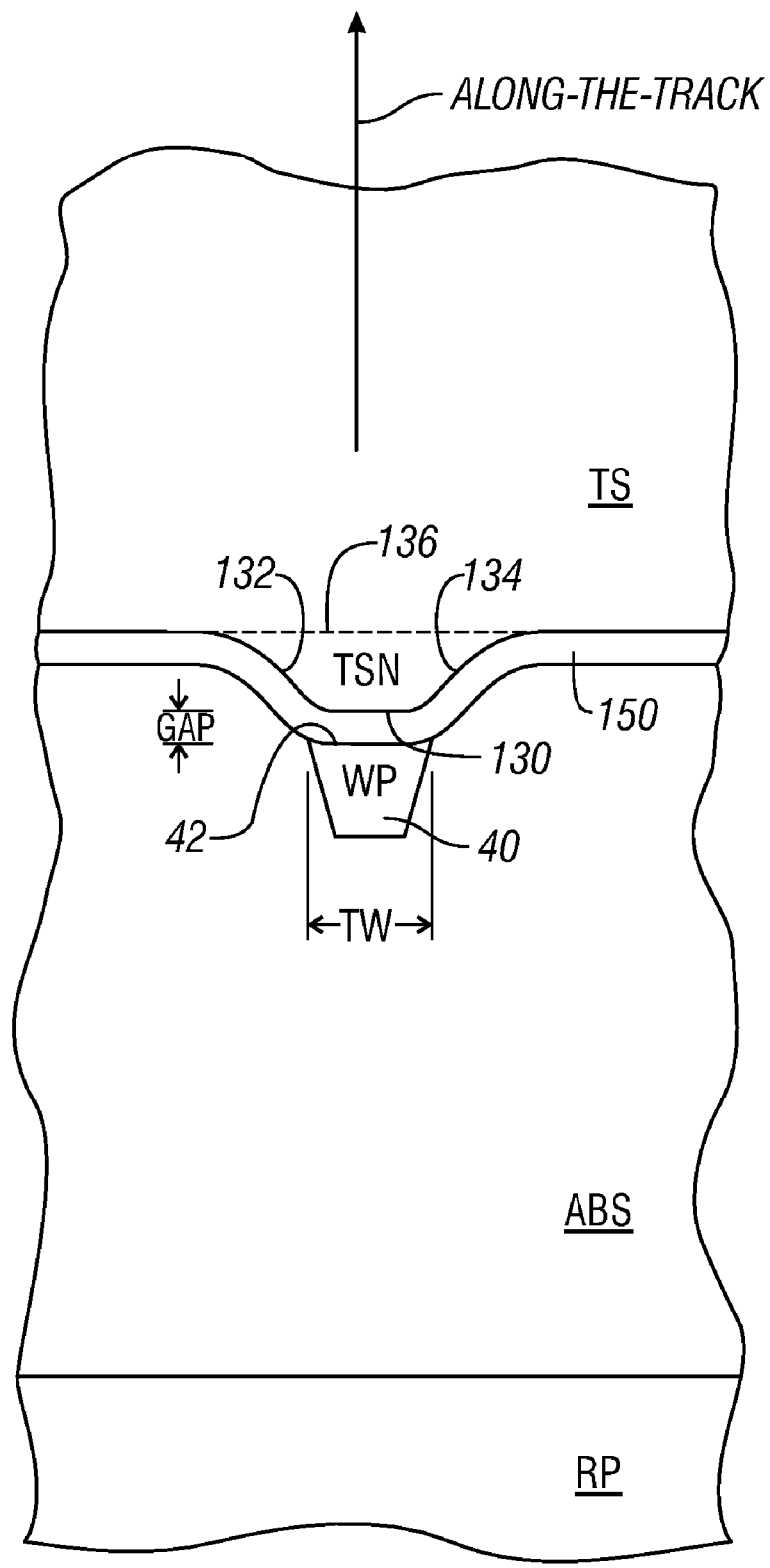
FIG. 4 is a view of the slider ABS for the write head according to this invention, as seen from the disk, and shows portions of the write head, with details of the WP, the trapezoidal-shaped TSN and the gap between the WP and the TSN.

The perpendicular magnetic recording write head according to this invention is shown in FIG. 4, which is a view of the slider ABS as seen from the disk. The TSN has a generally trapezoidal shape that includes front edge 130 and side edges 132, 134. TSN front edge 130 is generally parallel to the trailing edge 42 of the WP and thus generally orthogonal to the along-the-track direction. The TSN front edge 130 can also have a slight convex curvature. The side edges 132, 134 diverge from the TW as a result of the widened opening above the WP, with the result being that at the base where the TSN ends and the remainder of the TS begins (shown by dashed line 136) the TSN is substantially wider than the TW. The gap layer 150 that is in contact with the trailing edge 40 of the WP is formed entirely of material different from the material that surrounds the remainder of the WP. For example, the WP is typically surrounded by alumina, but the gap layer 150 is formed of a conductive nonmagnetic metal, such as Ta, Rh, or Ir. The WP has a typical thickness in the range of about 150-250 nm, the TW is in the range of about 80-150 nm, the gap layer has a thickness in the range of about 20-60 nm, and the distance between front edge 130 and the base 136 is in the range of about 20-150 nm. The widened opening for the TSN results in the base 136 being substantially wider than TW, e.g., about twice as wide as TW.

Figure 5A:
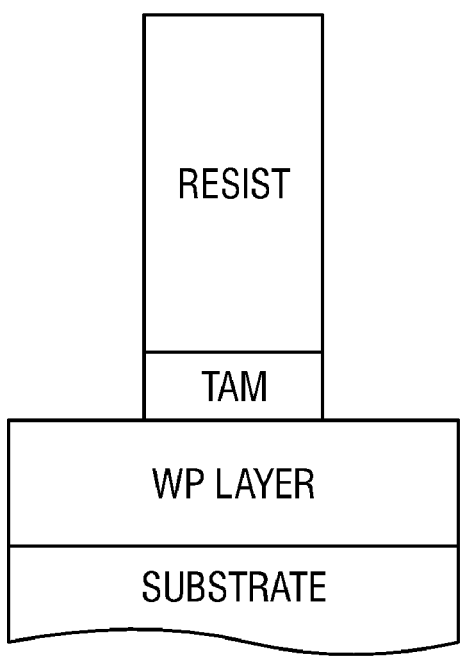
FIGS. 5A-5B illustrate the steps in forming the write head of this invention prior to forming the TS with TSN.
Figure 5B:
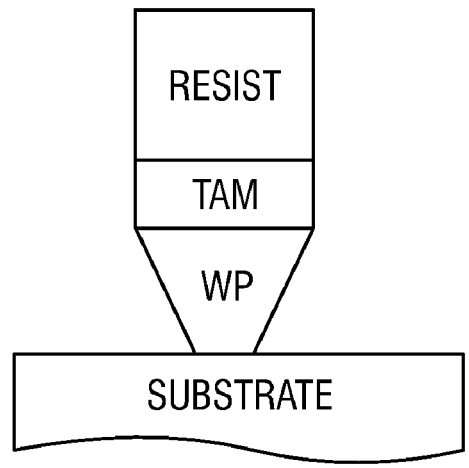

FIGS. 5A-5B illustrate the steps in forming the write head of this invention prior to forming the TS with TSN. The structure shown in FIG. 5A includes a "substrate", which is typically an alumina layer, deposited on the wafer from which a large number of read/write heads are fabricated. The layers for forming the read head are not shown and are typically deposited first on the wafer and would be located below the "substrate" in FIG. 5A. A WP layer of magnetic material is deposited on the substrate to a thickness corresponding to the desired thickness of the WP, typically in the range of about 150-250 nm. The WP layer is high-moment magnetic material, such as CoFe or NiFe, and is formed by sputtering or electroplating. A full film of alumina is deposited over the WP layer, typically by sputtering, and serves as a "thin alumina mask" (TAM) during subsequent ion milling to form the WP. Other materials that may serve as the mask include tantalum-oxide, silicon-oxide, silicon-nitride or diamond-like carbon. A layer of organic mask material, referred to herein as "resist", is deposited and patterned above the TAM and underlying WP layer. The resist layer may be a photo-sensitive organic material provided it is not sensitive to radiation at the wavelengths used in other lithographic steps for forming the write head, or a photo-insensitive organic material like Durimide® 20-1.2 μm, a polyimide material available from Arch Chemicals, Inc. The organic mask material used for the resist layer should be capable of removal by reactive ion etching (RIE) using $O_2$ or $CO_2$. FIG. 5A shows the structure after reactive ion beam etching (RIBE) with a mixture of $CHF_3$ and Ar has removed the TAM in the regions not covered by resist. Next, as shown in FIG. 5B, ion milling with Ar+ ions removes the WP layer in regions not covered by the resist and forms the WP. The use of the TAM together with the resist assists in forming the beveled shape of the WP shown in FIG. 5B because the TAM is removed at a slower rate during the ion milling.

Figure 6A:
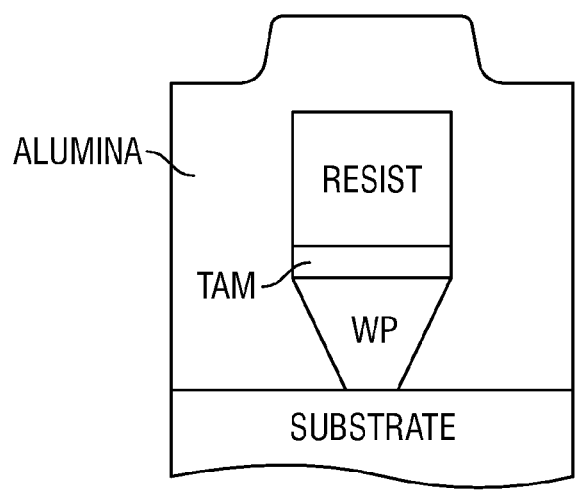
FIGS. 6A-6G illustrate the steps in forming the TS with TSN above the write pole according to this invention.
Figure 6B:
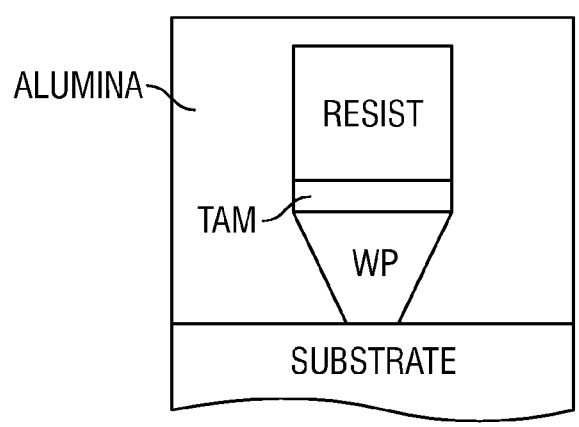
Figure 6C:
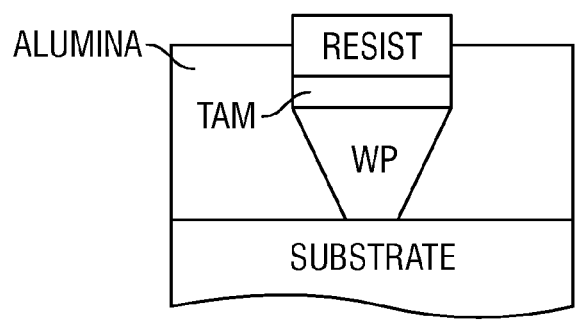
Figure 6D:
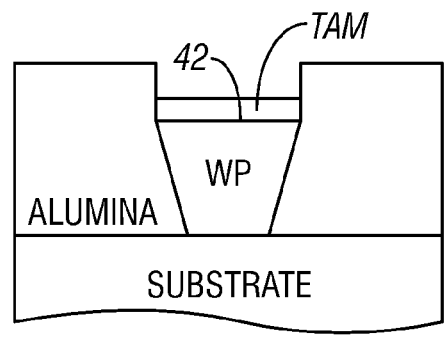
Figure 6E:
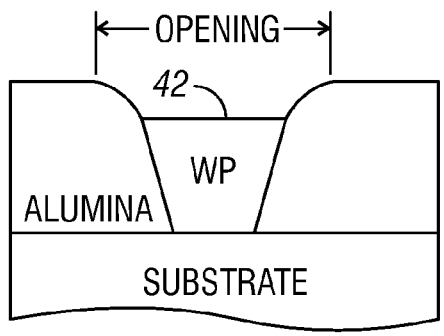
Figure 6F:
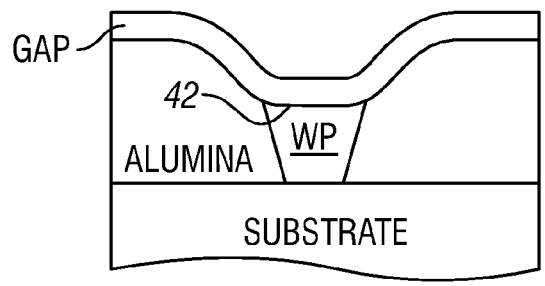
Figure 6G:
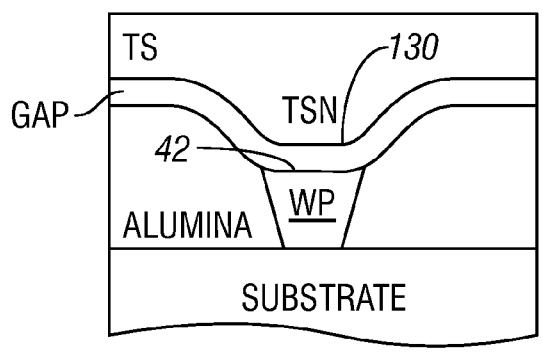

FIGS. 6A-6G illustrate the steps of this invention in forming the TS with TSN above the write pole. First, in FIG. 6A alumina filler material is deposited over the structure shown in FIG. 5B to fill both sides of the WP, TAM and resist. The alumina is deposited by sputtering or ion beam deposition to a thickness in the range of about 1.5 micron to cover the resist and fill the sides of the WP. This results in large topographical variations so chemical-mechanical-polishing (CMP) is used to planarize the surface, resulting in the structure of FIG. 6B. Next, in FIG. 6C the alumina filler and a portion of the resist is removed by RIBE with a mixture of $CHF_3$ and Ar, down to about 70 nm above the WP. This results in the resist being somewhat higher than the alumina filler, as shown in FIG. 6C, because alumina is removed at a faster rate than the resist by the RIBE. Next, the remaining resist is removed by reactive ion etching (RIE) using $O_2$ or $CO_2$. This removes only the organic resist material and does not affect the TAM, which remains above the trailing edge of the WP, or the alumina filler that remains at the edges of the WP, resulting in the structure of FIG. 6D. In FIG. 6E, the TAM is fully removed and the opening above the WP is widened by RIBE using pure $CHF_3$. This RIBE is performed preferably at a normal angle of incidence and at a very low beam voltage. The normal incidence angle has a strong effect on the alumina filler at the edges of the TAM and WP and causes widening of the opening substantially greater than the TW of the WP trailing edge 42. Angular milling at a relatively high angle of incidence, e.g., about 70 degrees from normal, will also result in widening of the opening, but will be less efficient at also removing the TAM. The wafer can be rotated during this RIBE to assure substantially complete removal of the TAM. The low beam voltage and no use of Ar during the RIBE removal of the TAM and widening of the opening assures that the magnetic material of the WP is not damaged. The result, as shown in FIG. 6E, is that the width of the opening is substantially wider than the width of the trailing edge 42 of the WP, with the sides of the opening diverging from the WP trailing edge. In FIG. 6F, the gap material is deposited in the widened opening, typically to a thickness in the range of about 20-60 nm, by sputtering. The gap layer covers not only the trailing edge 42 of the WP but the alumina on the sides of the WP. The gap layer may be a nonmagnetic metal, typically Ta, Rh or Ir. If the TS is to be deposited on the gap layer by electroplating, the gap layer should also be an electrically conductive material. If a non-conducting material is used for the gap layer and the TS is to be deposited by electroplating, then a conductive seed layer can be deposited on the gap layer. Next, in FIG. 6G, the magnetic material for the TS is deposited, typically by electroplating, over the gap layer, creating the TSN in the region above the WP, with the TSN having sides that diverge from the WP. The deposition of the TS material into the widened opening may also result in the front edge 130 of the TSN having a slight convex curvature. The TS is a magnetic material, such as CoFe or NiFe. After formation of the TS with the TSN, the write head structure is substantially as shown in FIG. 4.

Because the write head of this invention has a trailing shield gap than comprises only the nonmagnetic metal gap layer, without any mask material, a thinner gap results which improves the write field gradient produced by the write head. The process of this invention for removing the mask while simultaneously widening the opening for the notch removes substantially all of the mask material from above the write pole without damaging the magnetic material of the WP. The generally trapezoidal shape of the notch, which is wider than the WP, reduces saturation of the notch during writing. The generally trapezoidal shape of the notch, and the convex curvature of the front edge of the notch, also improves the curvature of the magnetic transitions written by the write pole.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for making a perpendicular magnetic recording write head having a write pole and a notched trailing shield comprising:

depositing on a substrate, a layer of magnetic write pole material having the desired thickness for the write pole;

depositing a thin nonmagnetic mask film on the write pole;

forming a patterned resist layer on the thin nonmagnetic mask film;

etching the thin nonmagnetic mask film and the write pole substantially to the substrate to leave the write pole with the thin nonmagnetic mask film in regions covered by the patterned resist layer, where the write pole is formed into a beveled shape;

covering the patterned resist layer, the thin nonmagnetic mask film, and the write pole with nonmagnetic filler material, such that sides of the write pole are filled with the nonmagnetic filler material;

removing a portion of the nonmagnetic filler material, leaving a thickness of the nonmagnetic filler material greater than a thickness of the write pole;

removing the patterned resist layer to leave an opening in the remaining nonmagnetic filler material exposing the thin nonmagnetic mask film and the write pole;

etching the thin nonmagnetic mask film and the nonmagnetic filler material at the edges of the thin nonmagnetic mask film to remove substantially all the thin nonmagnetic mask film and widen said opening;

depositing into said widened opening and over the remaining nonmagnetic filler material, a gap layer of nonmagnetic material; and depositing over said gap layer, a layer of magnetic trailing shield material, the portion of said trailing shield material within said widened opening forming a trailing shield notch spaced from the write pole by the gap layer.

2. The method of claim 1 wherein the trailing shield notch formed in the widened opening has a generally trapezoidal shape.

3. The method of claim 2 wherein the trailing shield notch has a front edge facing the write pole, said front edge having a slight convex curvature.

4. The method of claim 1 wherein depositing a the thin nonmagnetic mask film comprises depositing a thin alumina film.

5. The method of claim 1 wherein the gap layer is deposited directly on the write pole, the gap layer being selected from the group consisting of Ta, Rh and Ir.

6. The method of claim 1 wherein etching the thin nonmagnetic mask film and the nonmagnetic filler material at the edges of the thin nonmagnetic mask film comprises reactive ion beam etching (RIBE) in CHF3 to remove the thin nonmagnetic mask film without damaging the layer of magnetic write pole material.

7. The method of claim 6 wherein the RIBE is performed at a substantially normal angle of incidence to the thin nonmagnetic mask film.

* * * * *